United States Patent [19]
Fujita

[11] Patent Number: 5,400,254
[45] Date of Patent: Mar. 21, 1995

[54] TRACE DISPLAY APPARATUS FOR A NAVIGATION SYSTEM

[75] Inventor: Kazutomo Fujita, Yamatokoriyama, Japan

[73] Assignee: Sharp Kabushiki Kaisha, Osaka, Japan

[21] Appl. No.: 77,996

[22] Filed: Jun. 18, 1993

[30] Foreign Application Priority Data

Jun. 19, 1992 [JP] Japan .................. 4-161081

[51] Int. Cl.⁶ .......................... G06F 15/50
[52] U.S. Cl. .................. 364/449; 364/443; 340/995; 342/357
[58] Field of Search ......... 364/449, 450, 447, 443; 340/988, 990, 995; 342/357, 457, 120

[56] References Cited

U.S. PATENT DOCUMENTS

| | | | |
|---|---|---|---|
| 4,903,212 | 2/1990 | Yokouchi et al. | 364/447 |
| 4,963,865 | 10/1990 | Ichikawa et al. | 340/995 |
| 4,970,652 | 11/1990 | Nagashima | 364/449 |
| 4,989,151 | 1/1991 | Nuimura | 364/449 |
| 5,075,693 | 12/1991 | McMillan et al. | 342/457 |
| 5,161,886 | 11/1992 | De Jong et al. | 364/449 |
| 5,210,540 | 5/1993 | Masumoto | 342/357 |
| 5,265,025 | 11/1993 | Hirata | 364/449 |

FOREIGN PATENT DOCUMENTS

| | | |
|---|---|---|
| 57-32980 | 2/1982 | Japan . |
| 63-26529 | 2/1984 | Japan . |
| 2-243984 | 9/1990 | Japan . |
| 3-17688 | 1/1991 | Japan . |

*Primary Examiner*—Kevin J. Teska
*Assistant Examiner*—Tan Nguyen
*Attorney, Agent, or Firm*—Nixon & Vanderhye

[57] ABSTRACT

A trace display apparatus for a navigation system is provided to make it easy to grasp the change in altitude traces of a mobile body from a starting point to an end point. The apparatus receives radio waves from GPS artificial satellites to measure the spatial position of the mobile body. The three-dimensional data (latitude, longitude and altitude) of a measuring point on the traces are calculated by a processing device and then stored in a storage device. The moving traces of an automobile are obtained by displaying the map data and the two-dimensional position data (latitude and longitude) from the starting point to the end point out of the stored three-dimensional data. The altitudes in the data for the measuring points and the distances from the starting point to measuring points, which are calculated from the latitude, and longitude, are indicated on a graph. Adjacent measuring points on the graph are connected to each other by a straight line, whereby the change in altitude is able to be displayed continuously.

11 Claims, 5 Drawing Sheets

TRACE DISPLAY APPARATUS FOR A NAVIGATION SYSTEM

BACKGROUND OF THE INVENTION

1. Field of the Invention

The present invention relates to a trace display apparatus for a navigation system which is mounted on a mobile body.

2. Description of the Related Art

Generally, a conventional navigation system mounted on an automobile employs a positioning system in which the dead reckoning, the map-matching, and the global positioning system (hereafter, abbreviated as "GPS") are used in combination. In the dead reckoning, the traveling locus of the automobile is obtained by means of an azimuth sensor and a distance sensor which are mounted on the automobile, and a relative position of the automobile is calculated. A prior art of navigation system using the dead reckoning is disclosed, for example, in Japanese Unexamined Utility model Publication (Kokai) No. JP-U 57-32,980 (1982). In the map-matching, the position of the automobile on a map results from comparing the traveling locus of the automobile obtained by the dead reckoning with road arrangement appearing on the map, so as to determine the road on which the automobile has passed. Since the map-matching determines a relative position of the automobile, errors may be accumulated in the position data. However, when the position data are combined with the information about the absolute position of the automobile which is obtained from the GPS, the resulting position data have a higher accuracy.

The GPS is a novel positioning system which has been developed by the National Military Establishment of the U.S. and uses a plurality of artificial satellites. The artificial satellites are orbiting around the earth and always transmitting signals indicative of orbit data, the time or the like. At a measuring point, signals transmitted from four satellites among these artificial satellites are received, and the time periods required for arrival of the signals are obtained. The distance between each artificial satellite and the measuring point is calculated from these time periods, so that it is possible to obtain the three-dimensional position (latitude, longitude and altitude) of the measuring point. When the two-dimensional position (latitude and longitude) of the measuring point is to be obtained, signals from three artificial satellites are received to calculate. In the shade of buildings in an urban area or in a tunnel, however, it is impossible to receive signals from the artificial satellites. In such a case, the position of an automobile is obtained by the dead reckoning. Japanese Unexamined Patent Publication (Kokai) No. JP-A 2-243,984 (1990) discloses a prior art system in which, using artificial satellites, the position (latitude and longitude) of a measuring apparatus on the earth is obtained in a manner different from that of the GPS.

When the position of an automobile is measured in a navigation system, a map including the automobile position is displayed on screen of a display apparatus. The information of the map is previously stored in a read-only memory using a compact disk for the navigation system (hereafter, such a memory is abbreviated as "CD-ROM"). When necessary information is read out from the CD-ROM, a mark indicating the automobile position is then superimposed on the displayed map. When the automobile position almost reaches one end of the map, the display is automatically changed to the adjacent map. Furthermore, such system can receive transportation information from a road beacon to display it on the screen. The system can receive also position information to correct the obtained current position.

FIG. 6 shows an example of the display of moving traces 1 of an automobile as a traveling locus on a display apparatus by a typical prior art navigation system. The automobile departs from the starting point 2. The two-dimensional position (latitude and longitude) of the automobile is obtained by a position measurement using the GPS or the like, and the positions are recorded until the automobile arrives the end point 3. In the figure, the thin solid lines indicate roads on the map, and the thick solid lines indicate the moving traces 1 of the automobile.

FIG. 7 shows an example of the display to indicate moving traces 5 and an altitude for an automobile on a display apparatus according to another prior art navigation system. In FIG. 6, the moving traces 1 of the automobile are only two-dimensionally displayed. In FIG. 7, when the user designates a point 6 on the screen, the altitude value 7 corresponding to the point 6 is displayed in the right and lower portion of the screen. Prior art navigation systems using the GPS are disclosed, for example, in Japanese Unexamined Patent Publications (Kokai) No. JP-A 63-26,529 (1988) and JP-A 3-17,688 (1991).

A trace display apparatus for a navigation system according to any prior art, the altitude of a mobile body is not displayed as shown in FIG. 6, or the altitude value of an arbitrary point designated by the user is displayed on a screen. Therefore, it is not easy to grasp the altitude change in the traces of a mobile body from a starting point to an end point.

SUMMARY OF THE INVENTION

It is an object of the invention to provide a trace display apparatus for a navigation system in which the altitude change in the traces of a mobile body from a starting point to an end point can be easily grasped.

In order to achieve the object, the trace display apparatus for a navigation system according to the invention, which is mounted on a mobile body and sequentially displays the traces along which the mobile body has moved comprising:

position measuring means for measuring the current position of the mobile body, and for generating a signal to indicate space coordinates of the current position:

a memory, in response to the signal from the position measuring means, for sequentially storing the space coordinates indicating the position of the mobile body; and altitude displaying means, on the basis of the contents of the memory, for displaying the traces of the mobile body in the form of the altitude.

In the invention, the altitude displaying means may display the traces in the form of the altitude, using axis of abscissa for moving distance from a starting point, and the axis of ordinate for altitude.

In the invention, the moving distance from a starting point to an end point is divided into a plurality of sections, and approximated by connecting each sections by straight lines.

In the invention, the scale span of the abscissa axis is determined so that all measuring points from a starting point to an end point are able to displayed on one screen.

In the invention, the scale span of the ordinate axis is determined so that the maximum altitude in the traces of the mobile body is able to be displayed on one screen.

In the invention, the position measuring means receive radio waves from GPS artificial satellites, to calculate space coordinates consisting of a latitude, a longitude and an altitude.

Moreover, another trace display apparatus for a navigation system according to the invention, which is mounted on a mobile body and sequentially displays the traces along which the mobile body has moved comprising:

position measuring means for generating a signal to represent space coordinates indicating the current position of the mobile body:

a memory, in response to the signal from the position measuring means, for sequentially storing the space coordinates indicating the position of the mobile body;

input means for selecting whether a two-dimensional display, or an altitude display for the traces of the mobile body; and calculating means, in response to the output of the input means, for displaying a two-dimensional traces of the mobile body on the basis of the memory contents when the two-dimensional display is selected, and for performing a calculation for displaying the traces in the form of the altitude, on the basis of the memory contents when the altitude display is selected.

According to the invention, space coordinates which indicate the position of a mobile body and which are measured by the position measuring means are sequentially stored in the memory. On the basis of the contents in the memory, the moving traces i.e. the locus of the mobile body is displayed in the form of the altitude by the altitude displaying means. From this display, any change in altitude traces of the mobile body from a starting point to an end point is able to be easily grasped.

According to the invention, the altitude display of traces is conducted while the scale spans of the coordinate axis are determined so that the traces are able to be displayed on one screen. Therefore, it is easier to grasp the change.

According to the invention, furthermore, in order to easily grasp the change in altitude traces of a mobile body from a starting point to an end point along which the mobile body has moved, a trace display apparatus for a navigation system comprising position measuring means, a memory to sequentially store the space coordinates indicating the position of the mobile body in response to the signal from the position measuring means, input means, and calculation means. The position measuring means generates a signal to represent space coordinates indicating the current position of the mobile body. By the input means, whether a two-dimensional display or an altitude display is selected for the traces of the mobile body. In response to the output of the input means, the calculating means displays a two-dimensional traces of the mobile body on the basis of the memory contents when the two-dimensional display is selected, and performs a calculation for displaying the traces in the form of the altitude, on the basis of the memory contents when the trace altitude display is selected. In this way, since the traces are displayed in the form of the altitude, it is easy to grasp the change in altitude traces of the traveling mobile body from a starting point to an end point.

Namely, according to the invention, the change in altitude traces of the mobile body from a starting point to an end point is able to be continuously displayed on a trace display apparatus for a navigation system. The user, therefore, is able to easily grasp the change in altitude traces of the mobile body.

BRIEF DESCRIPTION OF THE DRAWINGS

Other and further objects, features, and advantages of the invention will be more explicit from the following detailed description taken with reference to the drawings wherein.

DETAILED DESCRIPTION OF THE INVENTION

Figure 1A:
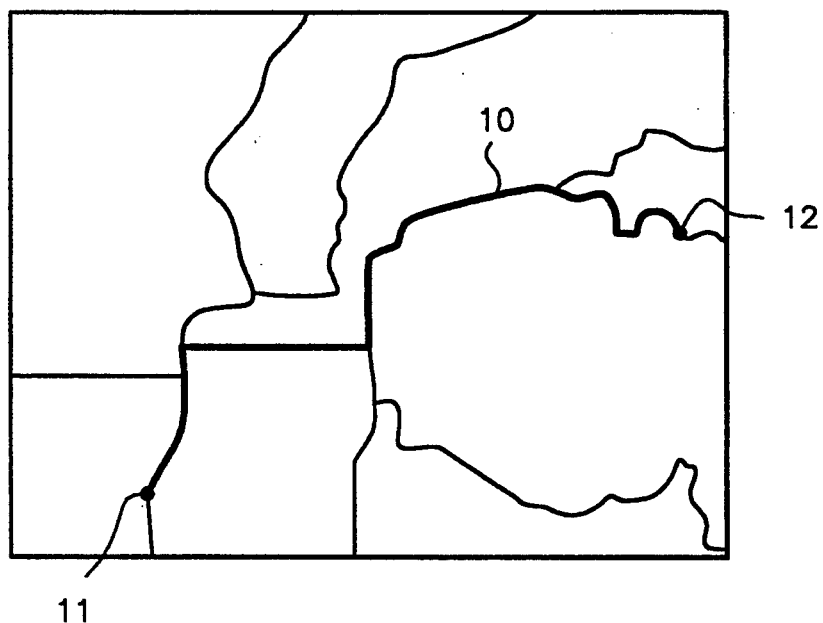
FIGS. 1 (A) and (B) show an example of the display by a trace display apparatus for a navigation system according to an embodiment of the invention, mounted on an automobile.

Now referring to the drawing, preferred embodiments of the invention are described below.

FIGS. 1 (A) and (B) show examples of display by a trace display apparatus for a navigation system according to an embodiment of the invention, mounted on an automobile. In FIG. 1(A), moving traces 10 of the automobile is displayed as a traveling locus. The automobile departs from the starting point 11. Among the three-dimensional position (latitude, longitude and altitude) obtained by a position measurement using the GPS or the like, the two-dimensional positions (latitude and longitude) are recorded until the automobile arrives the end point 12. In FIGS. 1 (A) and (B), the thin solid lines indicate roads on the map, and the thick solid lines indicate the moving traces 10 of the automobile.

Figure 1B:
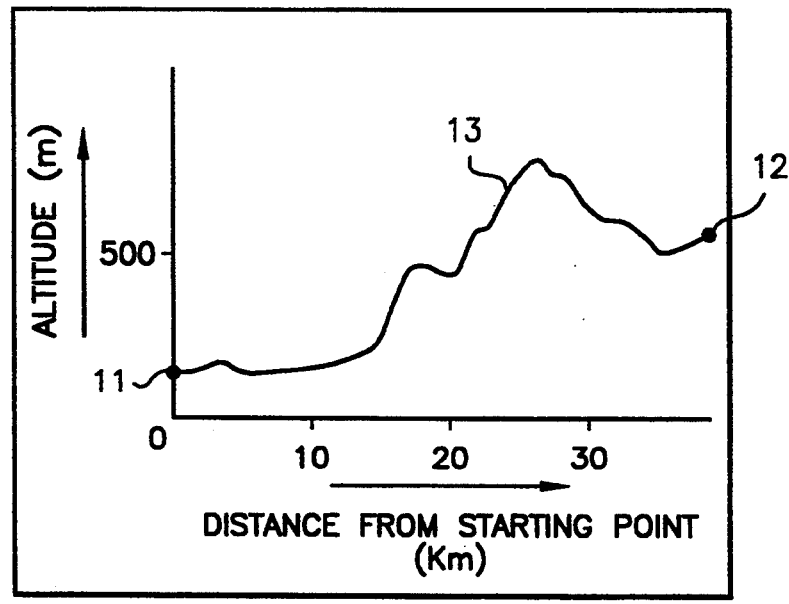

FIG. 1(B) shows the change in altitude corresponding to the moving traces of the automobile shown in FIG. 1(A). In the figure, the ordinate axis indicates the altitude, and the abscissa axis indicates the distance from the starting point. The portions corresponding to those of FIG. 1(A) are designated by the same reference numerals. When the traces of the altitude is continuously displayed on a display device as shown in FIG. 1(B), the change in altitude is able to be easily grasped.

Figure 2:
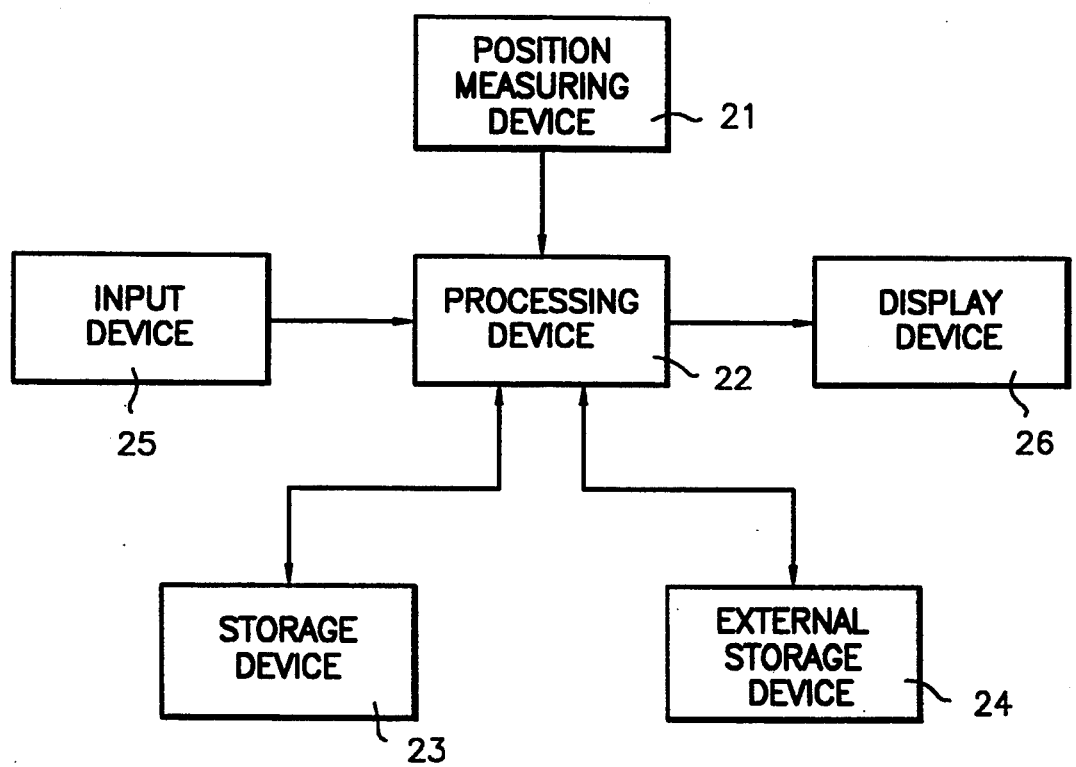
FIG. 2 is a block diagram showing a schematic electrical configuration of the whole system according to an embodiment of the invention, including the trace display apparatus for a navigation system, mounted on an automobile.

FIG. 2 is a block diagram showing a schematic electrical configuration of the whole system including the locus display apparatus for a navigation system according to an embodiment of the invention. A position measuring device 21 comprises an azimuth sensor, a distance sensor, a GPS device and the like. Position measuring data obtained by the sensors (and devices) are supplied to a processing device 22. The processing device 22 comprises a microcomputer (hereafter, abbreviated as "CPU") which calculates the measuring position of the automobile on the basis from the position measuring data from the position measuring device 21. The CPU controls the whole system. A storage device 23 consists of a read-only memory (hereafter, abbreviated as "ROM") into which processing programs for the CPU and other necessary information are previously stored, and a random access memory (hereafter, abbreviated as "RAM") for writing and reading information required in the execution of the programs. An external storage device 24 is a nonvolatile read-only memory such as a CD-ROM, into which map data, and the like are previously stored. The user performs a key input operation or the like to an input device 25 so as to give various instructions to the processing device 22. A display device 26 displays image data such as a map and is realized by a cathode ray tube (abbreviated as "CRT"), a liquid crystal display device (abbreviated as "LCD") or the like.

In the position measuring manner according to the navigation system, firstly, the position of the automobile is obtained by the dead reckoning using the azimuth and distance sensors in the position measuring device 21. The dead reckoning is a method to obtain a relative position of the automobile with respect to the starting point in which directions of the automobile detected by the azimuth sensor are subjected to the vector multiplication with every predetermined distance detected by the distance sensor. The calculation for obtaining the relative position is executed by the processing device 22. The azimuth sensor is able to be realized by a terrestrial magnetism sensor, an oscillatory gyroscopic sensor, or the like. A sensor for a speedometer or a mileage counter mounted on the automobile is able to be used as the distance sensor.

The processing device 22 compares the automobile moving traces obtained by the dead reckoning with the pattern of roads in the map data read out from the external storage device 24, so as to conduct a so-called map-matching, thereby calculating the position of the automobile on the map. Since the positions of the automobile obtained by map-matching is relative, errors may be accumulated in the position data. Therefore, on the basis of the absolute automobile position obtained by the GPS device of the position measuring device 21, the processing device 22 corrects the calculated automobile position to a more accurate automobile position. Although the map-matching enables to obtain two-dimensional position data (latitude and longitude) only, the GPS device of the position measuring device 21 enables to obtain three-dimensional position data (latitude, longitude and altitude). Alternatively, the three-dimensional position data may be obtained by the combination of an altimeter and the map-matching. Since an altimeter is to be used for only a relative measurement, measurement results must be corrected using data obtained by the GPS. When the measuring point is in the shade of a building or in a tunnel, however, it is impossible to receive ratio waves from artificial satellites, resulting in that the GPS is not able to execute the position measuring. In such a case, the position is measured in the dead reckoning navigation.

The automobile position calculated by the processing device 22 is superimposed with the vicinity map data which are read out from the external storage device 24, and then displayed on the display device 26. The display device 26 can display also the automobile moving traces shown in FIG. 1(A). In this case, on the basis of position measuring data which are output at predetermined time intervals from the position measuring device 21, the processing device 22 calculates three-dimensional position data (latitude, longitude and altitude), and the calculated three-dimensional position data of all positions from the starting point 11 to the end point 12 of FIG. 1(A) are stored. The processing device 22 reads out the two-dimensional position data (latitude and longitude) from the stored data, and calculates the moving traces of the automobile. The calculated moving traces are superimposed with the vicinity map data, which are read out from the external storage device 24, and then displayed. Through the input device 25, the user is able to designate the starting point 11 and the end point 12 of FIG. 1(A), and to set the conditions such as the recording interval. The user is able to use the input device 25 to change the display mode from the automobile moving trace display of FIG. 1(A) to the trace altitude display of FIG. 1(B) or vice versa.

Figure 3:
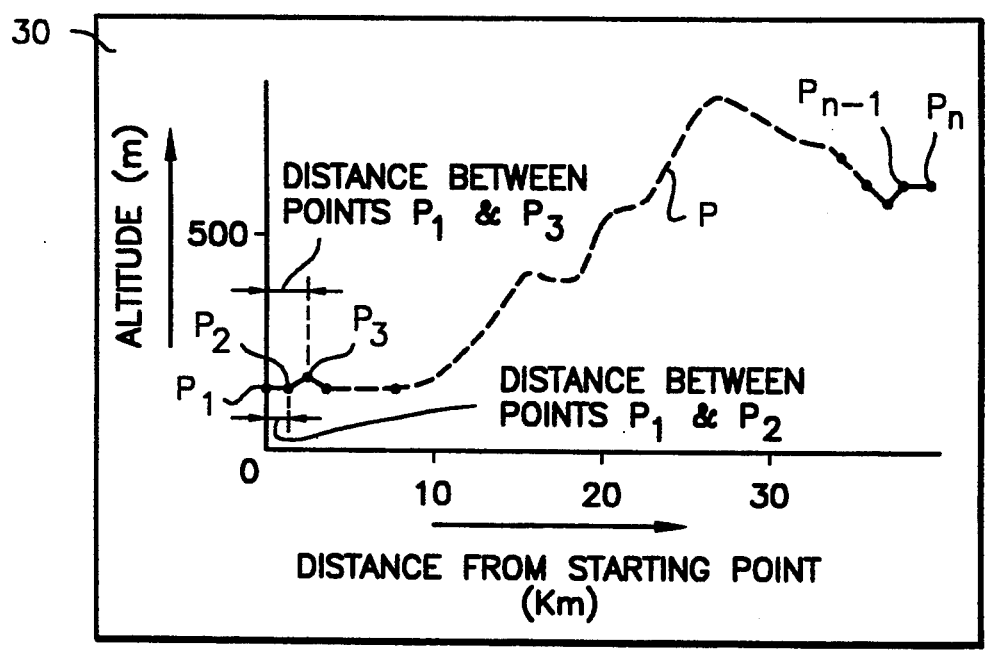
FIG. 3 is a diagram showing a process of generating the altitude display of the moving traces shown in FIG. 1(B)
Figure 4:
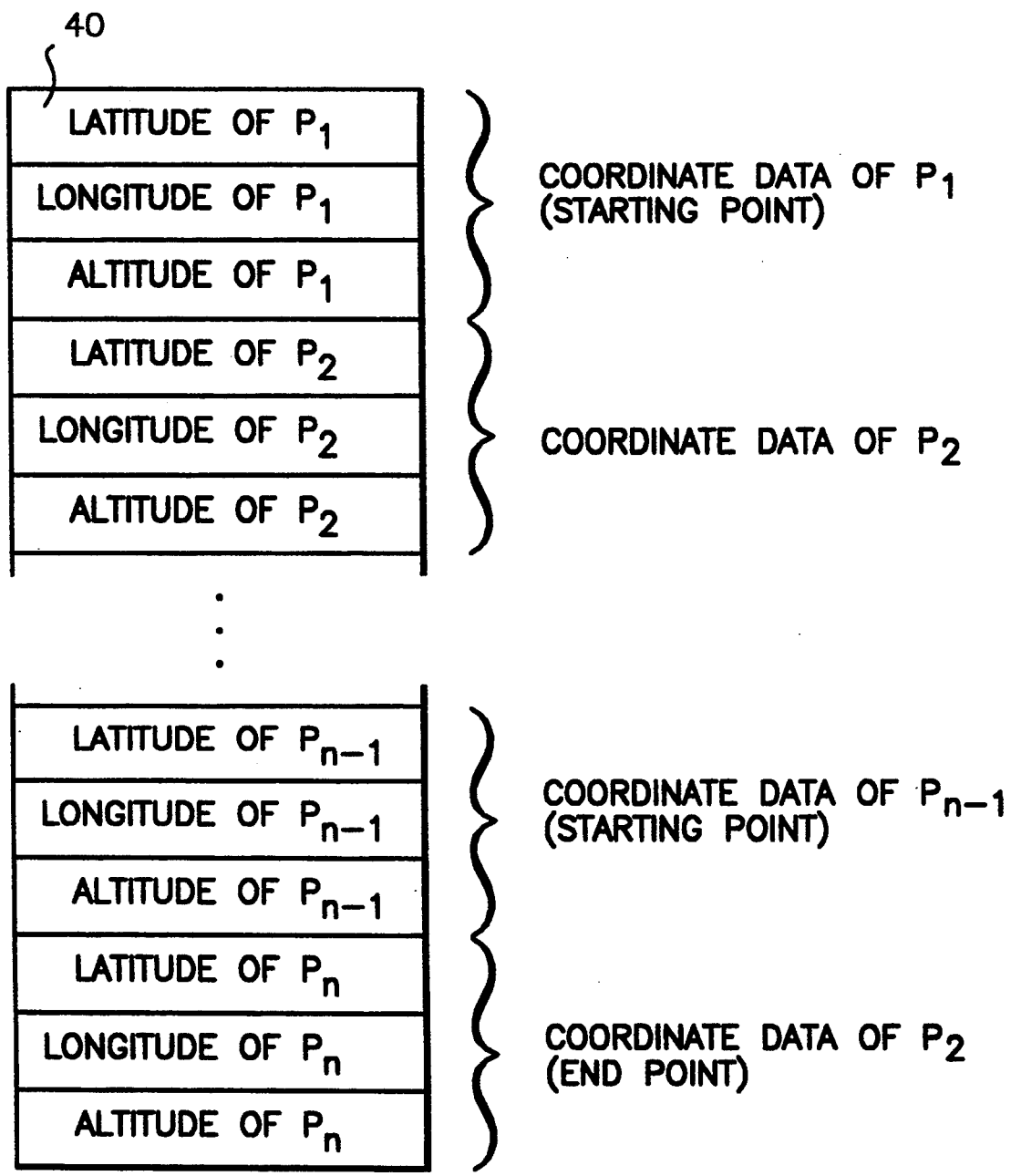
FIG. 4 is a diagram showing status of a memory 40 in a storage device 23 into which three-dimensional coordinate data of measuring points $P_1$ to $P_n$ in FIG. 3 are stored.

FIG. 3 is a diagram showing the process for generating the trace altitude display of the automobile shown in FIG. 1(B). FIG. 4 is a diagram showing the status of a memory 40 in the storage device 23, into which three-dimensional coordinate data of measuring points $P_1$ to $P_n$ in FIG. 3 are stored. In the graph shown in FIG. 3, the ordinate axis indicates the altitude, and the abscissa axis indicates the distance from the starting point. When a graph showing the altitude is to be prepared, firstly, the coordinate data of the measuring point $P_1$ are read out from the memory 40 of the storage device 23. On the basis of the coordinate data, the measuring point $P_1$ is indicated in the graph of FIG. 3. In this case, since the measuring point $P_1$ coincides with the starting point, the altitude data of the measuring point $P_1$ is indicated on the ordinate axis. Then, the coordinate data of the measuring point $P_2$ are read out from the memory 40 of the storage device 23. The distance between the measuring point $P_2$ and the starting point $P_1$ is approximated by a linear distance between the measuring points $P_1$ and $P_2$, and calculated from the latitudes and longitudes of these measuring points. The calculated data are combined with the altitude data of the measuring point $P_2$ to draw graph. When the distance between measuring points on a road in a map is to be obtained, since traces are not straight and the ground surface is not flat, it is impossible to accurately calculate the distance. Accordingly, the earth is regarded as a perfect sphere (or ellipse), and it is assumed that the distance between adjacent measuring points can be approximated by the length of a straight line connecting the measuring points. Thereafter, the coordinate data of the measuring point $P_3$ are read out from the memory 40 of the storage device 23. The distance between the measuring point $P_3$ and the starting point $P_1$ is obtained by calculating the linear distance between the measuring points $P_2$ and $P_3$, and by adding the calculated distance to the previously calculated linear distance between the measuring points $P_1$ and $P_2$. The measuring point $P_3$ is indicated in the graph by combining the calculated linear distance between the measuring point $P_3$ and the starting point $P_1$ with the altitude data. Similarly, the measuring points $P_4$ to $P_n$ are indicated in the graph. By connecting the points $P_1$ to $P_n$ with straight lines, the change in altitude of the moving traces is able to be continuously displayed as shown in FIG. 1(B). In the embodiment, the trace display apparatus for a navigation system is mounted on an automobile, it is needless to say that the invention can be applied to a trace display apparatus for a navigation system which is mounted on any mobile body including an airplane and a ship.

Figure 5:
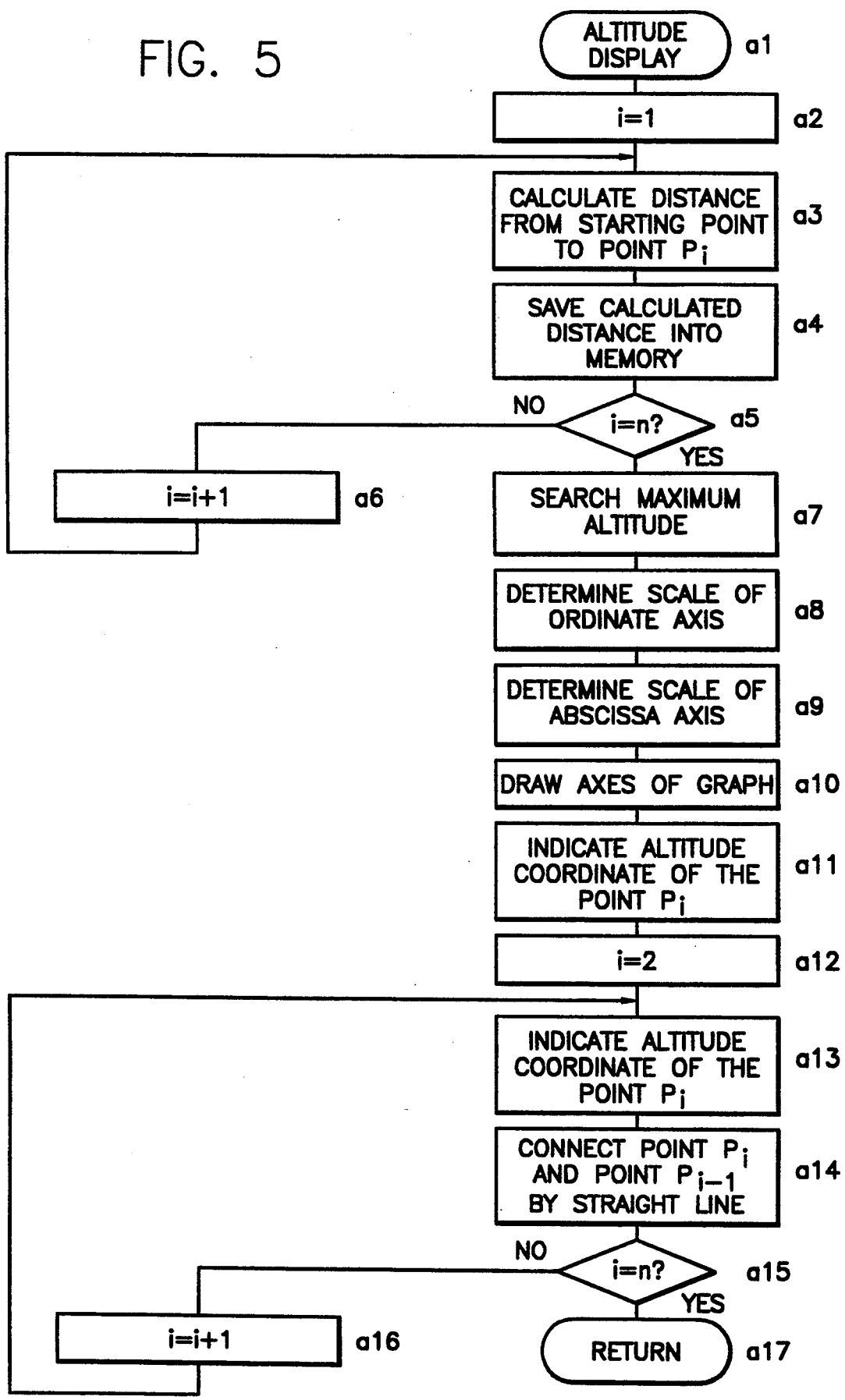
FIG. 5 is a flowchart showing the operation of a processing device 22 in the generating process of FIG. 3.
Figure 6:
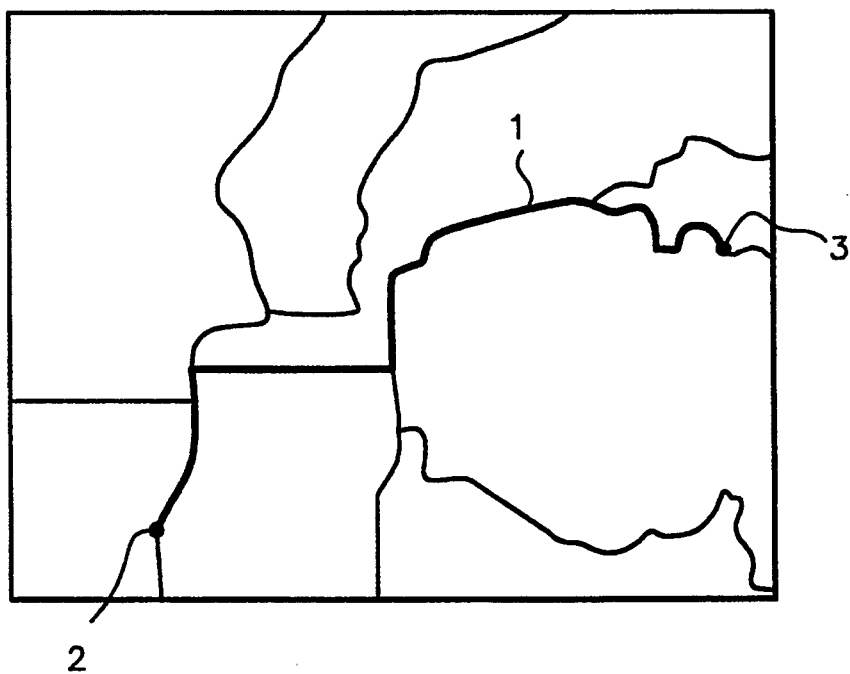
FIG. 6 shows an example of the moving trace display for an automobile on a display apparatus of a prior art navigation system.
Figure 7:
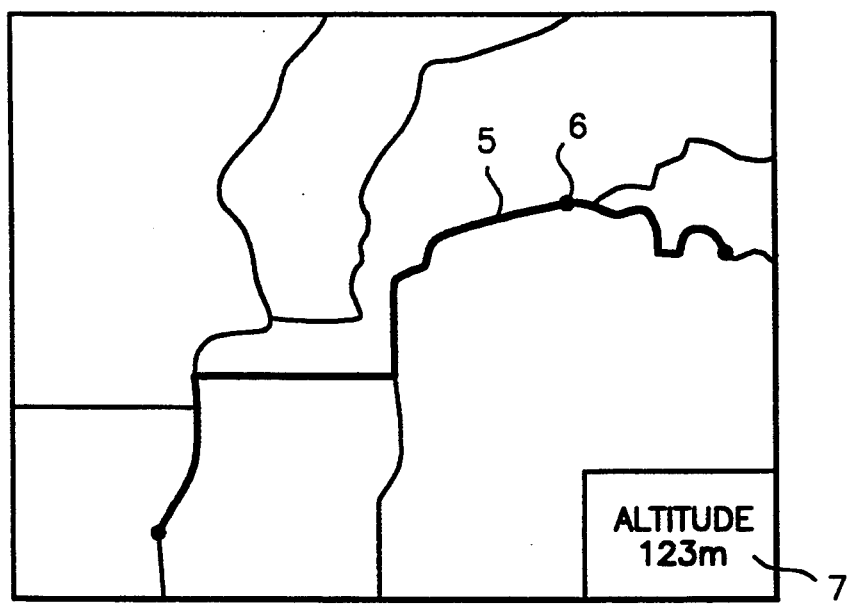
FIG. 7 shows an example of the moving trace and altitude display for an automobile on a display apparatus of another prior art navigation system.

FIG. 5 shows a flowchart of the process for generating the trace altitude display as shown in FIG. 3. The program for the altitude display begins at step a1 as a subroutine. At step a2, a parameter i is initialized to 1. The distance between the measuring point $P_i$ and the starting point is calculated in step a3. When i=1, that is, the measuring point $P_1$ coincides with the starting point, so that the distance equals 0. When i=2, the distance from the starting point to the point $P_2$ is the distance between the points $P_1$ and $P_2$, and therefore it is approximated by a linear distance as described above. The distance from the starting point to the point $P_3$ is the sum of the distance between the points $P_1$ and $P_2$ and the distance between the points $P_2$ and $P_3$. The distance between the points $P_2$ and $P_3$ is approximately obtained as a linear distance, and the distance is added to the previously obtained distance between the points $P_1$ and $P_2$, so that the distance from the starting point to the point $P_3$ is calculated. The distances between the measuring points $P_4$ to $P_n$ and the starting point are obtained in a similar manner. The calculated distances are temporarily stored in the memory at step a4. It is judged at step a5 whether or not the value of the parameter i reaches n. In case of "NO", the parameter i increases by one at step a6, and the process returns to step a3. In this way, the distances between the measuring points $P_1$ to $P_n$ and the starting point are respectively obtained.

In case of "YES" at step a5, the scale spans of the ordinate axis and abscissa axis are calculated at steps a7 to a9 so that the altitude coordinates of all the measuring points are displayed on one screen. At step a7, the maximum value of the altitude data for the measuring points $P_1$ to $P_n$ is searched. At step a8, the scale span of the ordinate axis is determined so that the data for the searched measuring point having the detected maximum altitude are able to be displayed on one screen. At step a9, the scale span of the abscissa axis is determined so that the maximum value of the distances between the measuring points and the starting point (i.e., the distance from the starting point to the point $P_n$) is able to be displayed on one screen.

Next, at step a10, a graph frame using the calculated scale spans is displayed on the screen. At step a11, the altitude coordinate of the point $P_1$, which coincides with the starting point, is indicated on the ordinate axis of the graph frame.

The parameter i is re-initialized to 2 at step a12. Steps from a13 to a16, the change in altitude of the traces is displayed. The distance between the measuring point $P_i$ and the starting point, which has been saved in the memory at step a4, is combined with its respective altitude data and indicated on the graph at step a13. The point $P_i$ and the point $P_{i-1}$ are connected to each other by a straight line at step a14. It is judged at step a15 whether or not the value of the parameter i reaches n. In case of "NO", the parameter i increases by one at step a16, and the process returns to step a13.

In case of "YES" at step a15, the subroutine ends at step a17 and the process returns to the original program. When the scale spans are determined at steps a7 to a9 so that all measuring points are displayed on one screen as large as possible, it is possible to use the screen effectively and to realize the display which is easy to see. Such a display is effective in a navigation system mounted on an automobile in which a screen size is limited and the displayed contents must be grasped by the driver at a glance.

The invention may be embodied in other specific forms without departing form the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A trace display apparatus for a navigation system mounted on a mobile body and sequentially displaying traces representative of a path along which the mobile body has moved, said apparatus comprising:
    position measuring means for measuring the current position of the mobile body, and for generating a signal representing space coordinates of the current position;
    a memory for sequentially storing the space coordinates indicating the position of the mobile body in response to the signal form the position measuring means; and
    altitude displaying means for displaying a trace representing both an altitude and distance for each segment of the displayed path of the mobile body.

2. A trace display apparatus for a navigation system as claimed in claim 1, wherein the altitude displaying means may display the traces in the form of the altitude, using the axis of abscissa for moving distance from a starting point, and the axis of ordinate for altitude.

3. A trace display apparatus for a navigation system as claimed in claim 2, wherein the moving distance from a starting point to an end point is divided into a plurality of sections, and approximated by connecting each section with straight line.

4. A trace display apparatus for a navigation system as claimed in claim 3, wherein the scale span of the abscissa axis is determined so that all measuring points from a starting point to an end point are able to be displayed on one screen.

5. A trace display apparatus for a navigation system as claimed in claim 4, wherein the position measuring means for receiving radio waves from GPS artifical satellites, to calculate space coordinates consisting of a latitude, a longitude and an altitude.

6. A trace display apparatus for a navigation system as claimed in claim 3, wherein the scale span of the ordinate axis is determined so that the maximum altitude in the traces of the mobile body is able be to displayed on one screen.

7. A trace display apparatus for a navigation system as claimed in claim 6, wherein the position measuring means for receiving radio waves from GPS artifical satellites, to calculate space coordinates consisting of a latitude, a longitude and an altitude.

8. A trace display apparatus for a navigation system as claimed in claim 3, wherein the position measuring means for receiving radio waves from GPS artifical satellites, to calculate space coordinates consisting of a latitude, a longitude and an altitude.

9. A trace display apparatus for a navigation system as claimed in claim 2, wherein the position measuring means for receiving radio waves from GPS artifical satellites, to calculate space to calculate space coordinates consisting of a latitude, a longitude and an altitude.

10. A trace display apparatus for a navigation system as claimed in claim 1, wherein the position measuring means may receive radio waves from GPS artificial satellites, to calculate space coordinates consisting of a latitude, a longitude and an altitude.

11. A trace display apparatus for a navigation system mounted on a mobile body and sequentially displaying traces representative of a path along which the mobile body has moved, said apparatus comprising:

position measuring means for generating a signal representing space coordinates indicating the current position of the mobile body;

a memory for sequentially storing the space coordinates in response to the signal from the position measuring means;

input means for alternatively selecting at least one of a two-dimensional display or an altitude display for the traces of the mobile body; and calculating means for calculating the coordinate values of a two-dimensional surface position trace of the mobile body on the basis of the memory contents when the two-dimensional display is selected, and for calculating the coordinate values of a two-dimensional altitude and distance trace on the basis of the memory contents when the altitude display is selected.

* * * * *